April 6, 1965   D. G. OREN   3,177,007
CARGO RESTRAINING MEANS
Filed May 16, 1963
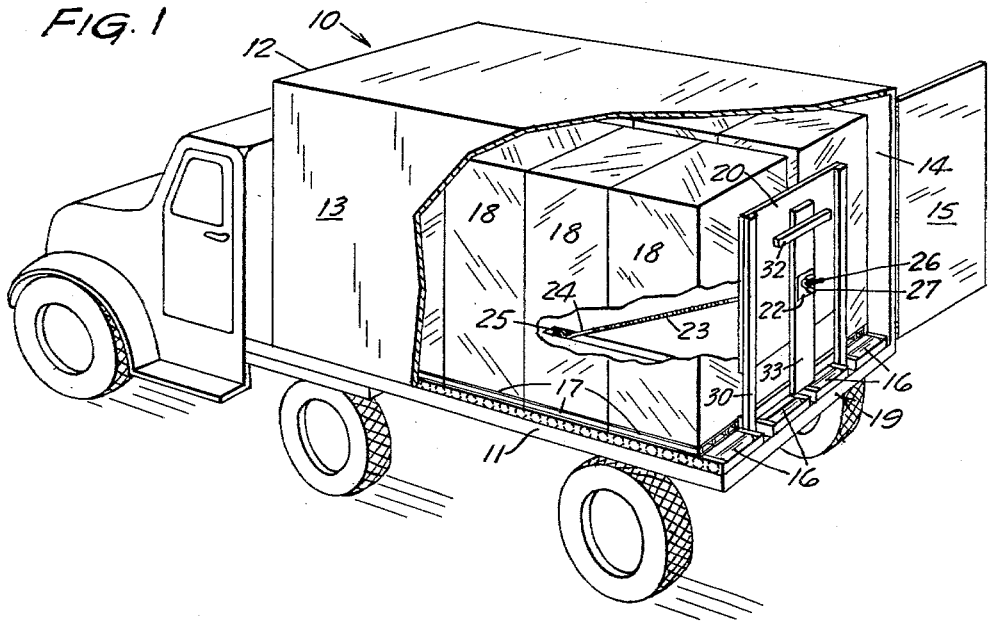
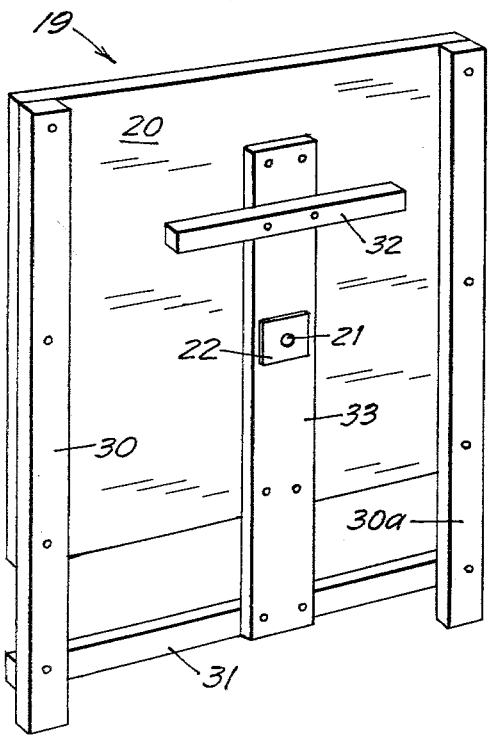
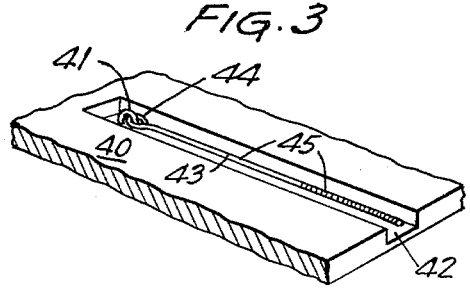
INVENTOR
DONALD G. OREN
ATTORNEY United States Patent Office 3,177,007
Patented Apr. 6, 1965

3,177,007
CARGO RESTRAINING MEANS
Donald G. Oren, 780 N. Prior Ave., St. Paul, Minn.
Filed May 16, 1963, Ser. No. 280,856
6 Claims. (Cl. 280—179)

This invention relates to a cargo restraining means, and particularly to such a means employed in combination with a semi-trailer truck or similar cargo carrier.

A common problem associated with all known cargo carriers is the tendency of the load to shift in transit. This problem arises on board ship, in railroad cars, trucks, in full trailers, and in semi-trailers pulled over highways by tractors. The present invention will be discussed with particular reference to the last named cargo carrier, in which its utility is outstanding.

Typical approximate internal dimensions of a semi-trailer are: width, 8 feet, height, 8 feet, and length, 40 feet. Semi-trailers ordinarily have a pair of floor-to-roof doors at the rear, hinged at the sides and occupying the entire end, through which the cargo is loaded. In many instances cargo is secured to wooden pallets, typically 44" x 56", but at any rate of a size such that two rows of palletized cargo can be loaded. Pallets are so constructed that they may be readily picked up by a forked lift truck, and, if desired, one pallet load of cargo may be stacked on top of another.

It is common to load semi-trailers by laying four one-foot wide conveyor track sections from the door to the front end of the trailer, so that palletized cargo can be easily rolled to the front of the truck during loading and just as easily rolled out during unloading. During sudden starts, stops, or changes in acceleration, the cargo in any carrier tends to shift its position, and such action is particularly noticeable when roller conveyor sections are employed. Sudden shifts of cargo may either damage the cargo itself or severely mar or damage the walls, ends, or doors of the trailer. Contrary to what might be supposed, the construction of a semi-trailer is relatively flimsy. Thus, although the floor is solid, rigid, and capable of supporting heavy loads, the sides, roof, and ends are actually constructed from comparatively thin light weight sheet material in order to minimize weight.

A wide variety of techniques have been employed to minimize the undesired movement of cargo. For example, cushions or wedges have been placed between the rear of the cargo and the trailer doors, but a certain amount of slack inevitably develops in transit and such methods are not especially successful. It is also common to extend "Pogo sticks" or jacks between the floor and roof of the trailer or between the two sides. These devices tend to damage the portions of the trailer which they contact and there is a fairly low limit to the amount of force which can be exerted against the sides or roof without permanently deforming the body. In addition, the aforementioned slack tends to bend, break, or dislodge such devices, often seriously marring the portions of the semi-trailer against which they are wedged. Since it is imperative that the interior sidewalls be extremely smooth to facilitate loading, it is clear that such wedging techniques cause as many problems as they solve.

It has been proposed to attack the problem by placing a gate-like member across the rear of the cargo, holding the member in position by adjustably attaching it to the sides. Because of the relatively weak nature of the trailer sides, as discussed previously, there is generally insufficient strength to hold the gate in position; further, the means for attaching the gates to the sides protrude and thus tend not only to reduce the payload which can be carried but also to injure cargo being slid to position along the otherwise smooth inner surfaces of the trailer. It has also been proposed to force the gate forward by means of jack screws extending through the rear of the carrier, but this is both inconvenient and unsatisfactory; it may also add a significant amount of unnecessary weight, an important disadvantage in highway transportation.

I have now devised a novel cargo restraining means which is particularly suitable for use with semi-trailers. My invention provides an easily operated means whereby cargo is held firmly in position so that it does not shift during transit, yet I accomplish this with a minimum of light, simple equipment which does not mar or deform the interior walls, which does not interfere with loading, and which does not occupy otherwise usable space.

In accordance with my invention I position a comparatively rigid panel member across the rear of the cargo, forcing the panel member forward, and thereby preventing the cargo from sliding rearward, by an elongate pulling means which is pivotally secured to the floor at one end and adjustably affixed to the panel member at the other end. In a preferred embodiment of my invention, the pulling means may be concealed in the floor so that the floor surface itself presents a smooth plane across which cargo can be slid at such times as the cargo restraining means is not in use. By making use of the comparatively strong and durable floor I avoid the problems which have heretofore plagued the trucking industry and which have rendered previous devices unacceptable.

My invention will be better understood by reference to the attached drawings in which like numbers refer to like parts in the several views and in which:

FIGURE 1 is a somewhat stylized isometric view of a loaded semi-trailer incorporating my invention, with certain portions cut away for better appreciation of the constructional details;

FIGURE 2 is a view of a presently preferred form of a panel member which is particularly suited for carrying out my invention; and FIGURE 3 is a view of a fragmentary section of floor, showing the manner in which the pulling means can be concealed.

Referring now to FIGURE 1, semi-trailer 10, having floor 11, front end wall 12, sides 13 and 14, and doors 15 is shown. (For purposes of clarity, only the right door is shown, but it will be understood that a conventional unit has a left door which is similarly hinged to the left rear corner side of the trailer.) Positioned on floor 11, and extending from end wall 12 to doors 15, are roller conveyor tracks 16, with pallets 17 bearing cargo 18 resting thereon. At the rear of cargo 18 is shown cargo restraining means 19, a principal portion of which is panel member 20. Approximately in the center of panel member 20, there is a hole 21, through which elongate pulling means 23 extends. The first, or forward, end 24 of pulling means 23 (in this case a chain) is attached to floor 11 by means of U-bolt 25. The second, or rearward, end portion 26 of pulling means 23 constitutes a threaded rod extending through hole 21, where it is held taut by a gripping means, such as wing nut 27 threaded thereon. A 6-inch diameter wheel, appropriately threaded, may be substituted for nut 27 to provide a conveniently operated gripping means. It will be readily appreciated that a wide variety of other materials—e.g., an airplane cable, one-piece threaded rod, or simple chain—could be employed in place of pulling means 23 to accomplish substantially the same result in substantially the same way, the gripping means being selected to suit the nature of the pulling means.

Referring now to FIGURE 2, preferred cargo restraining means 19 is shown in enlarged form. This device comprises panel member 20, which is supported at a fixed distance from the floor by legs 30 and 30a. For purposes of rigidity, and to act as a spacer to exert pressure directly against pallets 17, legs 30 and 30a are connected by crossbar 31, which in turn is joined to panel 20 by means of connecting member 33. Affixed to connecting member 33 and extending to each side thereof is handle 32, by means of which the cargo restraining means may be carried from place to place and positioned where desired. I contemplate that cargo restraining means 19 may be made from numerous materials and in a variety of designs—e.g., it might be solid, perforated, wood, metal fiberglass-reinforced resins, or made up of a grillwork of bars which are either interwoven, bolted, or welded together. Although not absolutely necessary, legs 30 and 30a provide a convenient means whereby conveyor track sections 16 may be straddled to permit forward and backward adjustment of the cargo restraining means as seems necessary. I have found that a very workable, economical, and sturdy cargo restraining means may be constructed from a 4 foot x 4 foot x ¾ inch plywood sheet as panel member 20, 6 foot 2 x 2's as legs 30 and 30a, a 4-foot 2 x 2 as crossbar 31, and a 20-inch 2 x 2 as handle 32. Connecting member 33 is desirably formed from a 1" x 8" oak plank, a steel plate 21 being affixed to the area immediately surrounding hole 20 to reduce wear on the wooden members. The exact size, strength, and shape of cargo restraining means 19 will be determined by the size of the cargo carrier and the nature of the cargo. The specific materials employed are not critical, however, as long as the panel is sufficiently strong.

FIGURE 3 illustrates a modification of my invention in which storage space is provided for the elongate pulling means below the surface of floor 40. In the portion of floor 40 shown, channel 42 extends from the rear of the truck forward to the place where it is desired to locate the forward end 44 of pulling means 43. Eye bolt 41, which is securely fastened to floor 40, serves to pivotally connect pulling means 43 to the bottom of channel 42. Pulling means 43 here comprises a threaded eye bolt, having eye 44 connected through eye bolt 41. The purpose of the modification of my invention shown in FIGURE 3 is to keep the loading surface of floor 40 free from obstruction, and many modifications will occur to those skilled in the art. For example, if the pulling means is a chain, it may be loosely coiled in a small circular depression in the floor when not in use.

Although my invention is particularly adapted for use in semi-trailers, as indicated, it may also be employed in combination with other cargo carriers. Additionally, my invention may be employed in connection with flat bed trailers having no side walls, doors, or roof, the cargo restraining means serving to force the cargo against a single forwardly located bulkhead.

Having described my invention with the aid of illustrative drawings, what I claim is as follows:

1. In combination with a cargo carrier having a floor and an end wall, a cargo restraining means comprising: a rigid movable panel member extending across said carrier parallel to said end wall and spaced therefrom, said panel member being on the order of at least half as wide and half as high as said end wall, said panel member having a hole located approximately in the center thereof, an elongate pulling means having a first end portion and a second end portion, said first end portion being pivotally secured to the floor at a point intermediate said end wall and said panel and said second end portion extending through said hole to the opposite side of said panel member so that the pulling means can form a substantially straight line at an acute angle to said floor, and an infinitely adjustable gripping means positioned on said opposite side of said panel member to hold said second end portion firmly and simultaneously urge said panel member toward said end wall, whereby cargo positioned between said end wall and said panel is held in substantially fixed position.

2. The combination of claim 1 in which the elongate pulling means is a chain.

3. The combination of claim 1 in which the elongate pulling means comprises a rod threaded at said second end portion and the adjustable gripping means comprises an internally threaded block.

4. In combination with a cargo carrier having a floor and an end wall, a cargo restraining means comprising: a rigid movable panel member extending across said carrier parallel to said end wall and spaced therefrom, said panel member comprising a flat body portion, a handle, and a plurality of spaced-apart legs depending from one side of said body portion to permit said panel member to straddle conveyor tracks placed on the floor and to be moved toward and away from said end wall while remaining in stable contact with said floor, said body member having a hole located approximately in the center thereof, an elongate pulling means having a first end portion and a second end portion, said first end portion being pivotally secured to the floor at a point intermediate said end wall and said panel and said second end portion extending through said hole to the opposite side of said panel member so that the pulling means can form a substantially straight line at an acute angle to said floor, and an infinitely adjustable gripping means positioned on said opposite side of said panel member to hold said second end portion firmly and simultaneously urge said panel member toward said end wall, whereby cargo positioned between said end wall and said panel is held in substantially fixed position.

5. In combination with a semi-trailer truck having a floor, a top, two side walls, a front wall and two rear doors, a cargo restraining means comprising: a rigid movable panel member extending across said carrier parallel to said end wall and spaced therefrom near said doors, said panel member comprising a flat body portion, a handle, and a plurality of spaced-apart legs depending from one side of said body portion to permit said panel member to straddle conveyor tracks placed on the floor and to be moved toward and away from said end wall while remaining in stable contact with said floor, said body member having a hole located approximately in the center thereof, an elongate pulling means having a first end portion and a second end portion, said first end portion being pivotally secured to the floor at a point intermediate said end wall and said panel and said second end portion extending through said hole to the opposite side of said panel member so that the pulling means can form a substantially straight line at an acute angle to said floor, and an infinitely adjustable gripping means positioned on said opposite side of said panel member to hold said second end portion firmly and simultaneously urge said panel member toward said end wall, whereby cargo positioned between said end wall and said panel is held in substantially fixed position.

6. In combination with a cargo carrier having a floor and an end wall, a cargo restraining means comprising: a rigid movable panel member extending across said carrier parallel to said end wall and spaced therefrom, said panel member having a hole located approximately in the center thereof, an elongate pulling means having a first end portion and a second end portion, said first end portion being pivotally secured to the floor at a point intermediate said end wall and said panel and said second end portion extending through said hole to the opposite side of said panel member so that the pulling means can form a substantially straight line at an acute angle to said floor, and an infinitely adjustable gripping means positioned on said opposite side of said panel member to hold said second end portion firmly and simultaneously urge said panel member toward said end wall, whereby cargo positioned between said end wall and said panel is held in substantially fixed position, said floor having a depression therein immediately adjacent the pivotal connection of the first end portion of said pulling means, the dimensions of said depression being such that said pulling means may be stored below the upper surface of the floor when not in use.

References Cited by the Examiner

UNITED STATES PATENTS

| | | | |
|---|---|---|---|
| 1,499,229 | 6/24 | Laffey | 105—369 |
| 2,819,688 | 1/58 | Hall | 105—369 |
| 2,972,490 | 2/61 | Styx | 280—179 |

MILTON BUCHLER, *Primary Examiner.*

A. HARRY LEVY, *Examiner.*